United States Patent [19]

Edgington

[11] 4,053,127

[45] Oct. 11, 1977

[54] APPARATUS FOR INDICATING RATE OF ICE ACCRETION

[75] Inventor: Geoffrey Edgington, Godalming, England

[73] Assignee: Lucas Industries Limited, Birmingham, England

[21] Appl. No.: 740,180

[22] Filed: Nov. 9, 1976

[30] Foreign Application Priority Data

Nov. 19, 1975 United Kingdom ............... 47592/75

[51] Int. Cl.$^2$ ............................................. G01B 13/04
[52] U.S. Cl. ................................. 244/134 F; 73/376; 73/178 R; 340/234
[58] Field of Search ....................... 244/134 R, 134 F; 73/178 R, 37.6; 340/234; 60/39.09 D

[56] References Cited

U.S. PATENT DOCUMENTS

| | | | |
|---|---|---|---|
| 3,058,305 | 10/1962 | Leigh | 244/134 R X |
| 3,996,787 | 12/1976 | Edgington | 244/134 F |

FOREIGN PATENT DOCUMENTS

| | | | |
|---|---|---|---|
| 2,530,357 | 1/1976 | Germany | 244/134 F |

Primary Examiner—Barry L. Kelmachter
Attorney, Agent, or Firm—Kane, Dalsimer, Kane, Sullivan and Kurucz

[57] ABSTRACT

Apparatus for indicating the rate of ice accretion on a surface particularly for use in aircraft comprising a hollow housing divided internally by a resilient diaphragm into first and second chambers. A first conduit communicating at one end with a gas supply and terminating at its other end in a first orifice. Intermediate the ends of the first conduit is a first restrictor and the first chamber of the housing communicates with the first conduit intermediate the first orifice and the first restrictor. Movable relative to the first orifice is a test surface upon which ice can form in use. The test surface is in use moved at a known speed and at a constant spacing from the first orifice. A second conduit communicates at one end with the gas supply and at its other end terminates in a second orifice. Intermediate the ends of the second conduit is a second restrictor and the second restrictor is variable, the setting thereof being determined by the position of the diaphragm in the housing. The second chamber of the housing communicates with the second conduit between the second restrictor and the second orifice and associated with the diaphragm is a proximity sensor for supplying a signal representative of the position of the diaphragm to a visual indicator. The second restrictor is arranged to effect a decrease in the restriction in the second conduit as the diaphragm moves in a direction to reduce the volume of the second chamber.

5 Claims, 1 Drawing Figure

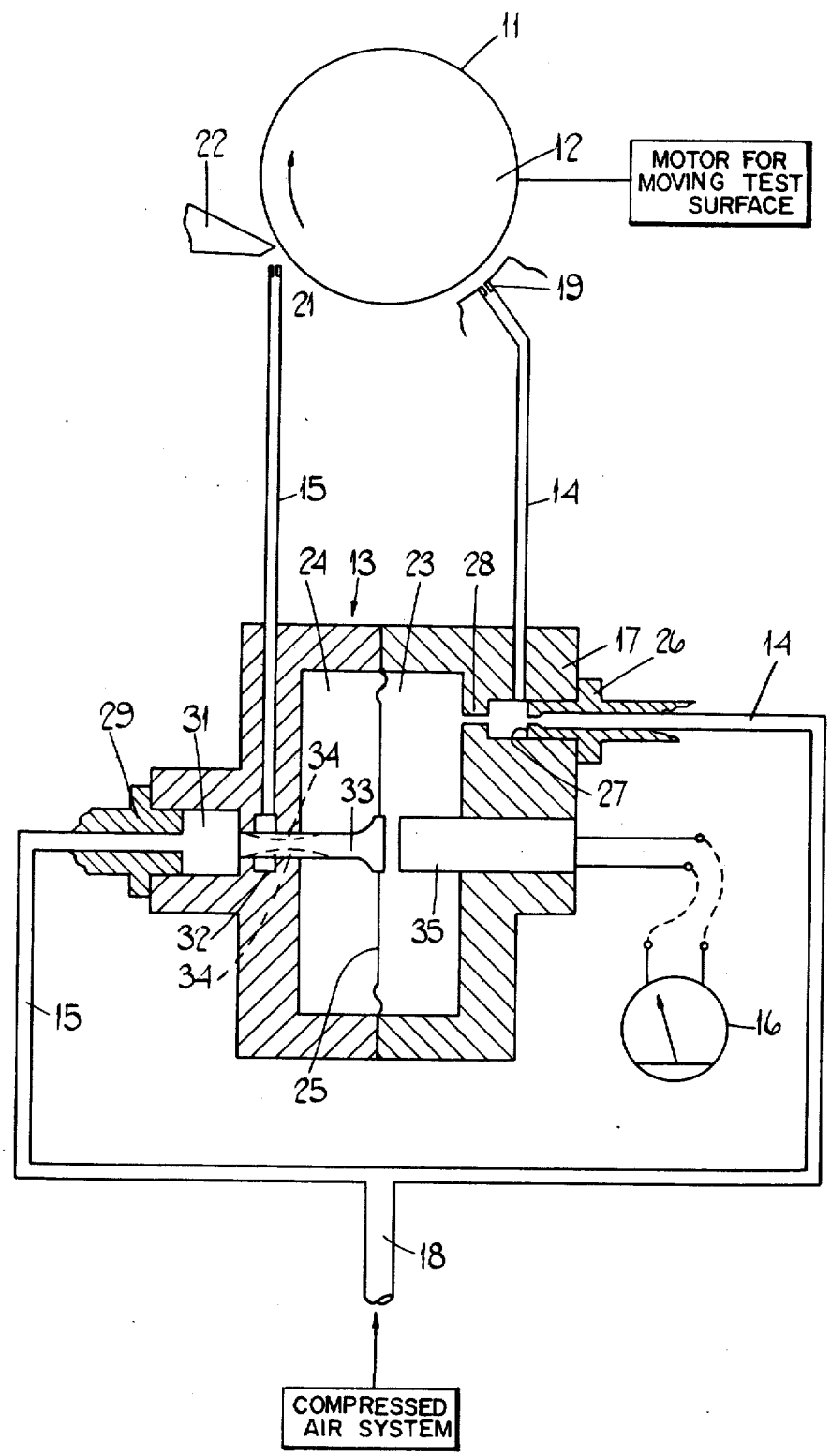

APPARATUS FOR INDICATING RATE OF ICE ACCRETION

This invention relates to apparatus for indicating rate of ice accretion on a surface and is particularly intended for use in aircraft.

Apparatus according to the invention includes a hollow housing, a resilient diaphragm dividing the housing internally into first and second chambers, a first conduit communicating at one end in use with a gas supply and terminating at its other end in a first orifice, a first restrictor intermediate the ends of the first conduit, and said first chamber communicating with said first conduit intermediate the first orifice and the first restrictor, a test surface upon which ice can form in use, means for moving the test surface past the first orifice at a known speed and at a constant spacing therefrom i.e. a conventional motor, a second conduit communicating at one end in use with said gas supply and terminating at its other end in a second orifice, a second restrictor being a variable restrictor the setting of which is determined by the position of the diaphragm relative to the housing, said second chamber communicating with said second conduit intermediate said second restrictor and said second orifice, and, means for supplying signal representative of the position of the diaphragm relative to the housing to an indicator, said second restrictor being arranged to effect a decrease in restriction in said second conduit as the diaphragm moves in a direction to reduce the volume of the second chamber, whereby when there is no ice on said test surface then the diaphragm assumes a rest position from which it is moved in a direction to reduce the volume of the second chamber chamber when the first orifice is restricted by ice forming on the test surface, this movement of the diaphragm reducing the restriction imparted in the second conduit by the second restrictor and so increasing the pressure in the second chamber so as to establish a new equilibrium position of the diaphragm, the change in position of the diaphragm being shown by the indicator and being directly related to the rate of ice accretion on the test surface so that the indicator can be considered as indicating rate of ice accretion.

Preferably, said first and second conduits are defined, in part, by said housing, and said first and second restrictors are supported by said housing.

Conveniently said second restrictor includes a movable spool element carried by said diaphragm, movement of the spool element relative to the housing varying the effect of the restrictor.

Preferably, the test surface is an endless test surface and there is provided mechanical means for removing ice from the test surface after the test surface passes the first orifice.

Desirably the second orifice is positioned adjacent said mechanical means so as to provide an air blast for clearing chips of ice from the locatlity of said mechanical means.

The accompanying drawing is a diagrammatic representation of apparatus for indicating rate of ice accretion, in accordance with one example of the present invention.

Referring to the drawing, the apparatus for indicating rate of ice accretion includes a test surface 11, which is the cylindrical surface of a metal cylinder 12. The cylinder 12 is rotatable about its longitudinal axis, and is positioned on the aircraft with part of its cylindrical surface exposed to the air flow, such that conditions at the exposed portion of the cylindrical surface 11 will be related to conditions at the regions of the surface of the aircraft where it is important to know the rate of ice accretion. The aircraft surface may for example be the leading edges of the wings, or the air intakes of the engines of the aircraft. Furthermore, in a helicopter the surfaces in question may be the rotor blade surfaces. It will be understood that it is not essential that the conditions at the exposed portions of the test surface 11 are identical to the conditions at the surface region in question, provided that the conditions are related, and the relationship is understood. Thus, if the atmospheric conditions are such that ice would form on the regions in question, then ice will fall similarly, and at a related rate on that portion of the surface 11 exposed to the air flow.

For convenience the cylinder 12 may be rotatably mounted in a nacelle of airfoil cross-section, the nacelle being mounted on the fuselage of the aircraft, and having therein a window through which a portion of the surface 11 is exposed.

The apparatus further includes a detector unit 13 first and second gas conduits 14, 15 and an indicator 16.

The conduits 14, 15 are each defined in part by the housing 17 of the unit 13 and each conduit communicates at one end with a common gas supply line 18 which in turn communicates with a supply of clean filtered air. The air supply can readily be derived from the aircraft compressed air system. At their ends remote from the supply line 18 the conduits 14, 15 terminate in respective first and second orifices 19, 21 the orifices 19, 21 being of similar dimensions. The orifice 19 is presented to the surface 11, and is spaced therefrom by a known gap. Thus as the cylinder 12 rotates the surface 11 continually passes the orifice 19 at a known spacing therefrom. Beyond the orifice 19, in the direction of rotation of the cylinder 12, is a scraper blade 22 which serves to dislodge any ice which has formed on te surface 11. Between the scraper 22, and the orifice 19 in the direction of rotation of the cylinder 12, lies the window in the nacelle through which the surface 11 is subject to the ambient air flow. Thus, assuming that the surface 11 is initally free of ice, then should the aircraft move into icing conditions then ice will start to form on that portion of the surface 11 exposed through aperture in the nacelle. Thereafter the iced portion of the surface 11 will move past the orifice 19, and will then be removed from the surface 11 by the scraper 22 so that as the surface 11 again passes into the region of the window in the nacelle it is once again free of ice. As will be described more fully hereinafter the orifice 21 is positioned adjacent the scraper 22 to aid ice removal.

The housing 17 of the unit 13 is hollow, and is divided internally into first and second chambers 23, 24 by a resilient diaphragm 25. The conduit 14 enters the wall of the housing 17 by means of a screw-threaded union 26 which includes an integral, first restrictor 27. Downstream of the restrictor 27, that is to say between the restrictor 27 and the orifice 19, the conduit 14 communicates with the chamber 23 by way of a passage 28. Thus, the pressure conditions existing within the conduit 14 between the orifice 19 and the restrictor 27 are communicated to the chamber 23 by the passage 28.

The conduit 15 enters the wall of the housing 17 by way of a screw-threaded union 29. The union 29 does not include a restrictor, and thus the unrestricted conduit 15 opens, within the wall of the housing, into a first sub-chamber 31. Between the sub-chamber 31 and the chamber 24 is a second sub-chamber 32, the sub-chamber 32 communicating freely with the downstream portion of the conduit 15, that is to say the portion of the conduit 15 terminating in the orifice 21. The sub-chamber 32 communicates with the chamber 24 and the sub-chamber 31 by way of respective aligned passages within which is slidably received a metal spool 33. The metal spool 33 is secured to the centre region of the diaphragm 25 and is formed with one or more tapering grooves 34. The groove or grooves 34 increase in depth from a minimum at the end of the spool 33 remote from the diaphragm to a maximum part way along the length of the spool. The range of movement of the diaphragm 25 is relatively small, and the arrangement is such that the groove or grooves in that portion of the spool within the passage connecting the sub-chamber 32 to the chamber 24 are sufficiently deep to afford a relatively unrestricted communication between the sub-chamber 32 and the chamber 24 throughout the range of movement of the spool. However, that portion of the spool lying within the passage connecting the sub-chamber 31 to the sub-chamber 32 contains a relatively shallow, tapering groove or grooves and thus provides a restriction in the communication between the sub-chambers 31, 32. Since the groove or grooves 34 taper then the restriction is variable. The restriction being reduced from a maximum, as shown, in the central rest position of the diaphragm, by movement of the diaphragm in a direction to reduce the volume of the chamber 24. It will be understood therefore that the spool 33 and the associated part of the housing 17 define a second restrictor of the apparatus, the second restrictor being a variable restrictor and in effect being within the conduit 15. By virture of the deep part of the groove or grooves 34 the chamber 24 is subject to the pressure conditions existing in the conduit 15 between the second restrictor and the orifice 21.

Secured to the wall of the housing 17, and extending within the chamber 23 towards the central region of the diaphragm 25 is a proximity sensor 35. The proximity sensor 35 is sensitive to the position of the spool 33, and therefore the position of the diaphragm 25 relative to the wall of the housing, and produces an output signal which is representative of the position of the diaphragm 25 relative to the wall of the housing. The output signal of the sensor 35 is applied to the visual indicator 16 which conveniently is positioned so as to be readily visible to either the pilot, or the flight engineer of the aircraft. Conveniently the visual indicator 16 is in the form of a meter, and the reading of the meter is thus varied in accordance with the position of the spool 33 relative to the sensor 35.

In use, assuming that no ice is forming on the test surface 11, then the orifice 19 is relatively unrestricted, and since the orifice 21 is unrestricted, and is of a similar dimension to the orifice 19, then the diaphragm 25 will occupy a rest condition wherein the second, variable restrictor produces a pressure drop similar to that produced by the first, fixed restrictor 27 so that the pressure in the chamber 24 is equal to the pressure in the chamber 23.

In the event that ice begins to form on the test surface 11 then as the layer of ice passes adjacent the orifice 19 then of course it restricts the orifice 19 since the layer of ice occupies part of the gap between the surface 11 and the orifice 19. The restriction of the orifice 19 causes a reduction in the air flow through the orifice 19 and thus an increase in the pressure in the conduit 14 between the orifice 19 and the restrictor 27. Thus the pressure in the chamber 23 rises and the diaphragm 25 is thus displaced in the direction reducing the volume of the chamber 24. Displacement of the diaphragm 25 in this direction moves the spool 33 such that deeper regions of the groove or grooves 34 are introduced into the part of the passage connecting the sub-chambers 31, 32 so reducing the restrictive effect of the second restrictor and increasing the pressure in the conduit 15 between the second restrictor and the orifice 21, and thus increasing the pressure in the chamber 24. It will be understood therefore that the variable restrictor is adjusted, by movement of the diaphragm 25, until the pressure in the chamber 24 rises to equal the pressure in the chamber 23 whereupon the diaphragm 25 reaches a new equilibrium position. In the new equilibrium position the air flow through the conduit 14 is reduced, since the orifice 19 is restricted, while the air flow in the conduit 15 is increased by the adjustment of the variable restrictor. Thus more air issues from the orifice 21 and thus there is more air available to constitute an air blast clearing ice chips from the region of the scraper 22. Clearly, the greater the ice thickness then the greater will be the restriction of the orifice 19, and the greater will be the pressure rise in the chambers 23 and 24, with consequential greater increase in air flow in the conduit 15. It will be understood therefore that as the ice thickness increases the air blast from the orifice 21 increases. Thus, in a general sense the air blast effect is greatest when the ice thickness is greatest. A rather more important feature of the increase in flow in the conduit 15 with increasing ice thickness is that the air demand of the apparatus is generally constant. Thus as the thickness of the ice layer increases the flow by way of the conduit 14 reduces, and at the same time the flow by way of the conduit 15 increases.

It will be appreciated from the foregoing description that the movement of the diaphragm 25 is directly related to the thickness of ice which forms on the test surface 11 during its exposure to the ambient air flow. The sensor 35 produces an output signal which is directly related to the position of the diaphragm 25 relative to the housing, and this output signal is applied to the indicator 16. In the rest position of the diaphragm the indicator 16 is set to read zero, said when ice is forming, the indicator indicates the rate of ice accretion of the test surface 11. It will be understood of course that the thickness of the ice is gauged by the system, but since the test surface 11 is moving at a known rate, and the surface is cleared of ice after passing the orifice 19, then the indication given by the indicator 16 is of rate of ice accretion and the scale of the meter constituting the indicator 16 is calibrated accordingly.

If desired, the cylinder 12 can be arranged to rotate selectively at two or more different predetermined speeds. The indicator 16 in such an arrangement will have a number of scales equal in number to the number of rotational speeds of cylinder, and thus the effective range of the apparatus can be increased. For example, in relatively light icing conditions a slow speed of rotation of the cylinder would be chosen, and the reading of rate of ice accretion would be taken from the appropriate scale. In heavy icing conditions a faster speed of rotation of the cylinder would be chosen.

If desired, rather than using a cylinder as the endless test surface the plain surface of a disc could be utilized. Moreover, the ice could be removed from the endless test surface in any one of a number of different ways, for example in preferance to the scraper a rotating cutter, or a localised heating device could be utilized. Furthermore, the endless test surface could be the surface of a wire, or ribbon of considerable length in which case it might well not be necessary to provide any ice removal means, the ribbon or wire being used once only.

It is to be understood that the variable restrictor described could be replaced by a number of different forms of variable resitrictor the setting of which would be controlled by the diaphragm 25. For example the spool 33 could be replaced by a tapered needle, the portion of the needle within the passage connecting the sub-chambers 31, 32 being tapered from a maximum adjacent the sub-chamber 31 towards a minimum at the sub-chamber 32.

It will be understood that the apparatus described above, with or without the modifications mentioned, accommodates automatically for fluctuations in the pressure of the air supply, and also for fluctuations in atmospheric pressure. Fluctuations in the supply pressure can of course result from extraneous intermittent demands on the airplane's air supply system and are accommodated by supplying both conduits 14, 15 from the same supply line. It will be understood that a certain mimimum air flow is required to operate the system, and provided that the supply pressure exceeds a corresponding minimum value then the actual pressure is not critical. The maximum supply pressure is governed by the pressure which the components will withstand, but in practice in the interests of air economy the operating pressure is maintained as low as is reasonably practicable. For this reason some form of pressure regulation is utilized to ensure that a reasonably constant, and predictable air flow in the conduit 18 is maintained, and as stated above the system itself has a realtively stable demand.

Fluctuations in atmospheric pressure can arise from barometric changes as well as from changes resulting from different flight altitudes. These changes are accommodated by ensuring that both orifices 19, 21 discharge to the same atmospheric pressure.

I claim:

1. Apparatus for indicating rate of ice accretion on a surface, comprising a hollow housing, a resilient diaphragm dividing the housing internally into first and second chambers, a first conduit communicating at one end in use with a gas supply and terminating at its other end in a first orifice, a first restrictor intermediate the ends of the first conduit, and said first chamber communicating with said first conduit intermediate the first orifice and the first restrictor, a test surface upon which ice can form in use, means for moving the test surface past the first orifice at a known speed and at a constant spacing therefrom, a second conduit communicating at one end in use with said gas supply and terminating at its other end in a second orifice, a second restrictor intermediate the ends of the second conduit, the second restrictor being a variable restrictor the setting of which is determined by the position of the diaphragm relative to the housing, said second chamber communicating with said second conduit intermediate said second restrictor and said second orifice, and, means for supplying a signal representative of the position of the diaphragm relative to the housing to an indicator, said second restrictor being arranged to effect a decrease in restriction in said second conduit as the diaphragm moves in a direction to reduce the volume of the second chamber, whereby when there is no ice on said test surface the diaphragm assumes a rest position from which it is moved in a direction to reduce the volume of the second chamber when the first orifice is restricted by ice forming on the test surface, the movement of the diaphragm reducing the restricion imparted in the second conduit by the second restrictor and so increasing the pressure in the second chamber so as to establish a new equilibrium position of the diaphragm, the change in position of the diaphragm being shown by the indicator and being directly related to the rate of ice accretion on the test surface so that the indicator can be considered as indicating rate of ice accretion.

2. Apparatus as claimed in claim 1 wherein said first and second conduits are defined in part by said housing, and said first and second restrictors are supported by said housing.

3. Apparatus as claimed in claim 1 wherein said second restrictor includes a movable spool element carried by said diaphragm, movement of the spool element relative to the housing varying the effect of the restrictor.

4. Apparatus as claimed in claim 1 wherein the test surface is an endless test surface and there is provided mechanical means for removing the ice from the test surface after the test surface passes the first orifice.

5. Apparatus as claimed in claim 4 wherein the second orifice is positioned ajdacnet said mechanical means so as to provide an air blast for clearing chips of ice from the locality of said mechanical means.

* * * * *